United States Patent
Xu et al.

(10) Patent No.: US 10,518,231 B2
(45) Date of Patent: Dec. 31, 2019

(54) DROPLET PREPARATION AND SIZE CONTROL DEVICE BASED ON ELECTROWETTING STEP EMULSIFICATION

(71) Applicant: ZHEJIANG UNIVERSITY, Hangzhou, Zhejiang (CN)

(72) Inventors: Zhongbin Xu, Zhejiang (CN); Binbin He, Zhejiang (CN); Xing Huang, Zhejiang (CN); Zhengke Wang, Zhejiang (CN); Baicun Wang, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 0 days.

(21) Appl. No.: 16/078,017

(22) PCT Filed: Sep. 28, 2017

(86) PCT No.: PCT/CN2017/103844
§ 371 (c)(1),
(2) Date: Aug. 21, 2018

(87) PCT Pub. No.: WO2019/033513
PCT Pub. Date: Feb. 21, 2019

(65) Prior Publication Data
US 2019/0329195 A1    Oct. 31, 2019

(30) Foreign Application Priority Data
Aug. 16, 2017    (CN) .......................... 2017 1 0702091

(51) Int. Cl.
*B01F 13/00* (2006.01)
*B01F 3/08* (2006.01)
*G05D 5/06* (2006.01)

(52) U.S. Cl.
CPC ........ *B01F 13/0076* (2013.01); *B01F 3/0815* (2013.01); *G05D 5/06* (2013.01);
(Continued)

(58) Field of Classification Search
CPC ................ B01F 13/0076; B01F 3/0815; B01F 2215/0032; B01F 2215/0036; B01F 2003/083; G05D 5/06
See application file for complete search history.

(56) References Cited

FOREIGN PATENT DOCUMENTS

| CN | 103966454 A | 8/2014 |
|---|---|---|
| CN | 105413772 A | 3/2016 |

OTHER PUBLICATIONS

M. He, et al. "Effects of Ultrasmall Orifices on the Electrogeneration of Femtoliter-Volume Aqueous Doplets", Langmuir, 22(14): p. 6204-6213, Jul. 2006.*

(Continued)

*Primary Examiner* — J. Christopher Ball

(57) ABSTRACT

A droplet preparation and size control device based on electrowetting step emulsification is provided, including a syringe pump, a metal pipeline, a micro-channel, two electrode plates, a continuous phase container and a direct-current power supply, wherein: the syringe pump, the metal pipeline and the micro-channel are successively connected; an outlet of the micro-channel is clamped and sealed between the two electrode plates; each electrode plate consists of four layers, respectively a base layer, a conducting layer, an insulating layer and a hydrophobic layer; a cathode of the direct-current power supply is connected with the metal pipeline, and an anode of the direct-current power supply is connected with the conducting layer of each electrode plate; the syringe pump is filled with dispersed (Continued)

phase fluid; continuous phase fluid is injected into the continuous phase container and immerses the electrode plates.

5 Claims, 2 Drawing Sheets

(52) U.S. Cl.
CPC . *B01F 2003/083* (2013.01); *B01F 2215/0032* (2013.01); *B01F 2215/0036* (2013.01)

(56) References Cited

OTHER PUBLICATIONS

Z. Li et al., Step-emulsification in a microfluidic device, Lab on a Chip, 2015, vol. 15, No. 4, pp. 1023-1031.

* cited by examiner

DROPLET PREPARATION AND SIZE CONTROL DEVICE BASED ON ELECTROWETTING STEP EMULSIFICATION

CROSS REFERENCE OF RELATED APPLICATION

This is a U.S. National Stage under 35 U.S.C 371 of the International Application PCT/CN2017/103844, filed Sep. 28, 2017, which claims priority under 35 U.S.C. 119(a-d) to CN 201710702091.7, filed Aug. 16, 2017.

BACKGROUND OF THE PRESENT INVENTION

Field of Invention

The present invention relates to technical fields of microfluidics, chemical engineering and bio-pharmaceuticals, and more particularly to a droplet preparation and size control device based on electrowetting step emulsification.

Description of Related Arts

The micro-droplets have wide applications in chemical engineering, pharmaceuticals and biochemistry. The ultra-uniform micro-droplets can serve as the standard droplets, and can also be applied in fields such as the high-precision biochemical and immunological experiments. The droplets, prepared through some common preparation methods such as the spraying method, do not have the high enough uniformity. In comparison, the microfluidic method has the relatively high precision and greatly high controllability, which gradually becomes the important method of micro-droplet preparation.

The common microfluidic micro-droplet preparation methods include the T-junction method, the focusing method, the co-flow method, the step emulsification method and so on. For the traditional step emulsification method, once the device is fixed, the sizes of the micro-droplets can be adjusted only through adjusting the flow, and the adjustment range of the micro-droplet sizes is greatly limited. When preparing the ultra-uniform micro-droplets, the precise micro/nanoscale flow control is difficult to be completed, so that a certain flow fluctuation inevitably exists and a fast response of the flow is required, which has greatly high requirements on the overall fluid system and is difficult to be realized in actual applications.

SUMMARY OF THE PRESENT INVENTION

In order to solve problems existing in prior art, the present invention provides a droplet preparation and size control device based on electrowetting step emulsification, which is able to increase controllability of micro-droplets, adjust sizes of the micro-droplets in a larger range and eliminate a size fluctuation of the micro-droplets caused by a flow fluctuation with utilizing characteristics of electrowetting, thereby preparing the ultra-uniform micro-droplets.

Detailed technical solutions are described as follows.

A droplet preparation and size control device based on electrowetting step emulsification comprises a syringe pump (1), a metal pipeline (3), a micro-channel (4), two electrode plates (5), a continuous phase container (6) and a direct-current power supply (7), wherein: the syringe pump (1), the metal pipeline (3) and the micro-channel (4) are successively connected; an outlet of the micro-channel (4) is clamped and sealed between the two electrode plates (5); each electrode plate (5) consists of four layers, respectively a base layer, a conducting layer, an insulating layer and a hydrophobic layer; a cathode of the direct-current power supply (7) is connected with the metal pipeline (3), and an anode of the direct-current power supply (7) is connected with the conducting layer of each electrode plate (5); the syringe pump (1) is filled with dispersed phase fluid; continuous phase fluid is injected into the continuous phase container (6) and immerses the electrode plates (5); the syringe pump (1) is pulled, so that droplets are generated at lower parts of the electrode plates (5); then the direct-current power supply (7) is switched on, so as to enable the dispersed phase fluid in the micro-channel (4) to be negatively charged; the two electrode plates (5) are positively charged and form a capacitor; when a flow of the syringe pump (1) changes, sizes of the droplets are adjusted through adjusting a voltage of the direct-current power supply (7), so as to stably obtain the droplets with a specified diameter.

Preferably, the droplet preparation and size control device further comprises a flow sensor (2) and a single chip microcomputer (8), wherein the flow sensor (2) is connected between the syringe pump (1) and the metal pipeline (3); a signal collection port of the single chip microcomputer (8) is connected with the flow sensor (2), and a control signal output port of the single chip microcomputer (8) is connected with a communication port of the direct-current power supply (7); according to a function relationship among the diameter of each droplet, the flow and the voltage, which is obtained through a history test, the single chip microcomputer (8) automatically measures a current flow and adjusts the voltage of the direct-current power supply, so as to obtain the uniform droplets with the specified diameter.

Preferably, a distance between the two electrode plates (5) is h, a distance from the outlet of the micro-channel (4) to bottom sides of the electrode plates (5) is l, l≥3h.

Preferably, the dispersed phase fluid comprises components of glycerinum, water and sodium chloride with weight percentages respectively of 80 wt %, 19 wt % and 1 wt %; and the continuous phase fluid comprises components of silicone oil and surfactant with weight percentages respectively of 95 wt % and 5 wt %.

Preferably, for each electrode plate, the base layer adopts a high-transparent glass, the conducting layer adopts an indium-tin-oxide coated film, the insulating layer adopts a polymide coated film, and the hydrophobic layer adopts a Teflon AF1600 spin-coated film.

Compared with the prior art, the present invention has following beneficial effects.

Firstly, compared with the micro-droplets prepared in other ways, the micro-droplets generated through electrowetting step emulsification have the better mono-dispersity, and the preparation process is more stable.

Secondary, compared with the common step emulsification, the electrowetting step emulsification can adjust the sizes of the micro-droplets through adjusting the voltage, so that the sizes of the droplets can be rapidly adjusted in a larger range; the system reaction speed is better than that of the traditional flow control method; and moreover, the controllable range of the sizes of the micro-droplets can be expanded together with the flow control method.

Thirdly, the present invention can detect the flow fluctuation situation through the real-time flow monitoring and stabilize the sizes of the micro-droplets through the single chip microcomputer, so that the size fluctuation of the micro-droplets caused by the flow fluctuation is eliminated, the variable coefficient of the micro-droplets is greatly decreased, and the ultra-uniform millimeter-scale droplets are prepared.

In figures: 1: syringe pump; 2: flow sensor; 3: metal pipeline; 4: micro-channel; 5: electrode plate; 6: continuous phase container; 7: direct-current power supply; and 8: single chip microcomputer.

DETAILED DESCRIPTION OF THE PREFERRED EMBODIMENT

The present invention is further described in detail with accompanying drawings and the preferred embodiment. It should be understood that the preferred embodiment described herein is merely for explaining the present invention, not for limiting the present invention.

Figure 1:
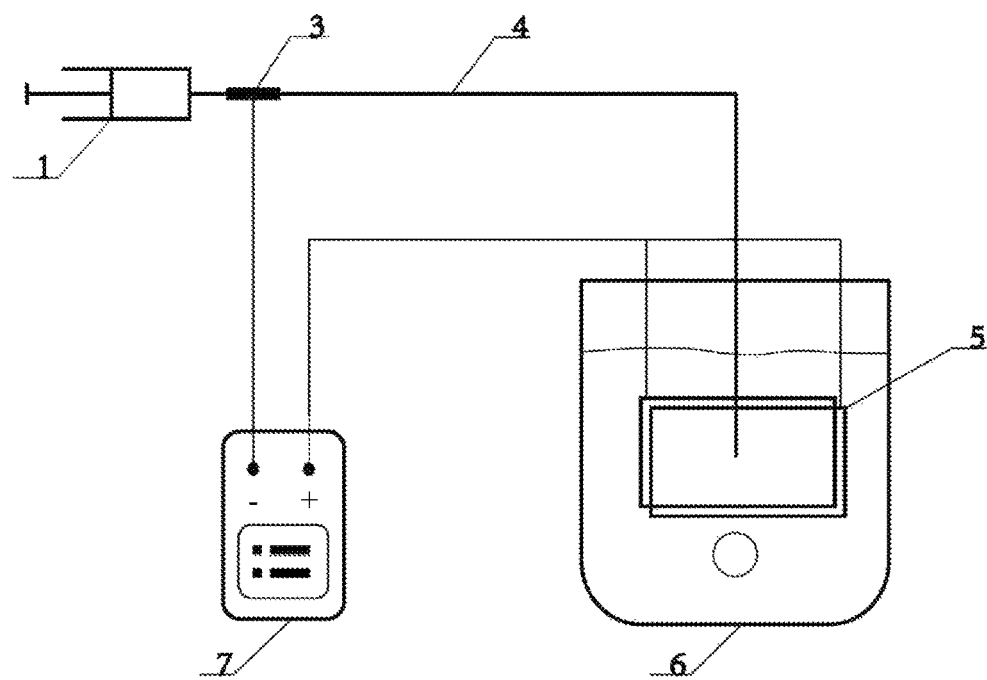
FIG. 1 is a sketch view of a droplet preparation and size control device based on electrowetting according to a preferred embodiment of the present invention.
Figure 3:
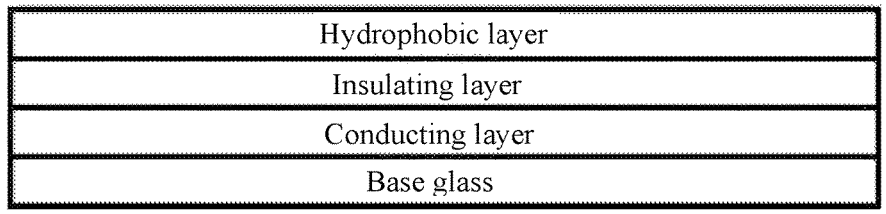
FIG. 3 is a structural sketch view of an electrode plate according to the preferred embodiment of the present invention.

As shown in FIG. 1, a droplet preparation and size control device based on electrowetting step emulsification comprises a syringe pump 1, a metal pipeline 3, a micro-channel 4, two electrode plates 5, a continuous phase container 6 and a direct-current power supply 7, wherein the syringe pump 1, the metal pipeline 3 and the micro-channel 4 are successively connected; an outlet of the micro-channel 4 is clamped and sealed between the two electrode plates 5; each electrode plate 5 consists of four layers, respectively a base layer, a conducting layer, an insulating layer and a hydrophobic layer, as shown in FIG. 3; a cathode of the direct-current power supply 7 is connected with the metal pipeline 3, and an anode of the direct-current power supply 7 is connected with the conducting layer of each electrode plate 5; the micro-channel 4 is filled with dispersed phase fluid; and continuous phase fluid in the continuous phase container 6 immerses the electrode plates 5.

The dispersed phase fluid is a conducting solution, comprising components of glycerinum, water and sodium chloride with weight percentages respectively of 80 wt %, 19 wt % and 1 wt %; and the dispersed phase fluid is stored in the syringe pump. The continuous phase fluid is silicone oil with 5 wt % of surfactant (dow coming 749) added into the silicon oil, and the continuous phase fluid is stored in the continuous phase container.

For each electrode plate 5, the base layer adopts a high-transparent glass, the conducting layer adopts an indium-tin-oxide coated film, the insulating layer adopts a polymide coated film, and the hydrophobic layer adopts a Teflon AF1600 spin-coated film. The conducting layer of about dozens of micrometers at edges of the conducting glass is firstly removed by abrasive paper. Then, a diluted polymide solution with a volume ratio of dimethylformamide to polymide being 3:1 is coated on the indium-tin-oxide glass. A speed of a spin coater is adjusted to 5000 rmp, and the glass is processed with spin coating for 1 minute. After spin coating, the glass is dried in a drying oven, particularly comprising steps of: drying the glass at 70° C. for 5 hours; then drying at 120° C. for 8 hours; and drying at 220° C. for 10 hours. The electrode plate after drying is sprayed with a hydrophobing agent and aired; the insulating layer of about 1 mm at two sides is removed and a wire is connected to here through a conductive silver adhesive. A distance between the two electrode plates is h=0.3 mm, and a distance from the outlet of the micro-channel to a bottom side of a dispersed phase output interface is 1.5 mm.

Before connecting the anode of the direct-current power supply 7 to the conducting layer of each electrode plate 5, an interface part of each electrode plate 5 is processed for removing the insulating layer, so that the conducting layer is exposed.

The syringe pump 1 is pulled, so as to generate the droplets at lower parts of the electrode plates 5; then the direct-current power supply 7 is switched on, so as to enable the dispersed phase fluid in the micro-channel 4 to be negatively charged; the two electrode plates 5 are positively charged and form a capacitor; sizes of the droplets are adjusted through adjusting a voltage of the direct-current power supply.

Figure 4:
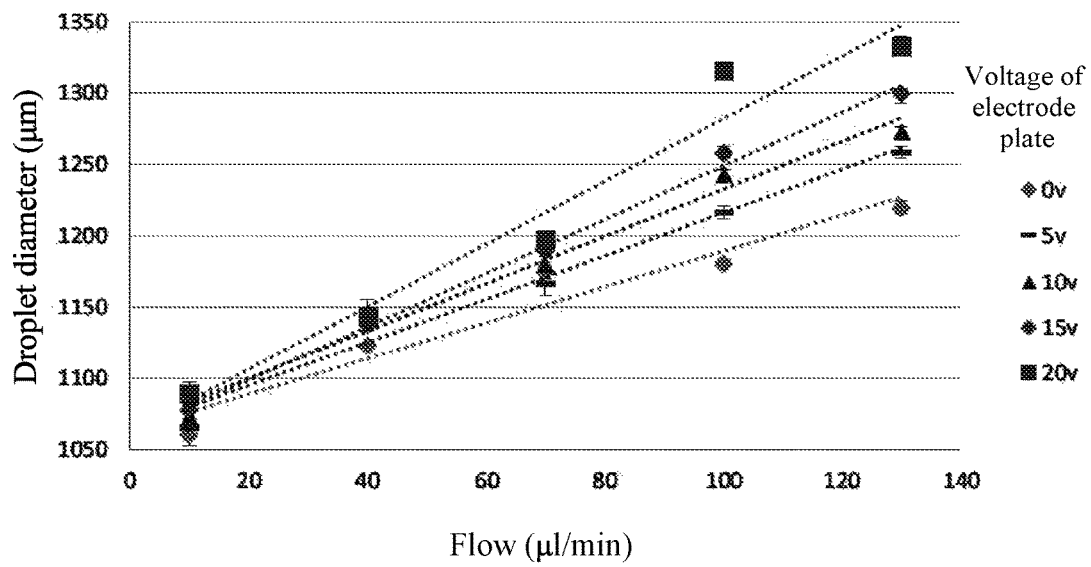
FIG. 4 is a sketch view of measured (droplet diameter)-flow-voltage curves with adopting the device shown in FIG. 1.

FIG. 4 is a sketch view of measured (droplet diameter)-flow-voltage curves with adopting the device shown in FIG. 1. When controlling merely with the flow without exerting the voltage (namely a line with a voltage of 0), a range of the sizes of the micro-droplets is [1070, 1220] (unit: μm). When adjusting with the flow combined with the voltage, take a maximum flow of 130 μl/min as an example, if the voltage gradually increases from 0 V to 20 V, a maximum value of the sizes of the micro-droplets gradually increases from 1220 μm to 1350 μm. For the preferred embodiment, it can be seen that: through adjusting and controlling with the flow combined with the voltage, a controllable range of the sizes of the micro-droplets is expanded from [1070, 1220] (unit: μm) to [1070, 1350] (unit: μm); if further increasing the voltage, the upper limit can be further raised. It can be also seen from FIG. 4 that: the flow and the voltage together determine the final sizes of the micro-droplets; when the flow gradually increases from 60 μl/min to 100 μl/min and meanwhile the voltage decreases from 20 V to 2V, the final sizes of the micro-droplets are both about 1200 μm. Thus, through the curve diagram, an automatic control system is designed for controlling the voltage and the flow, so as to finally prepare the ultra-uniform micro-droplets with the specified size.

Figure 2:
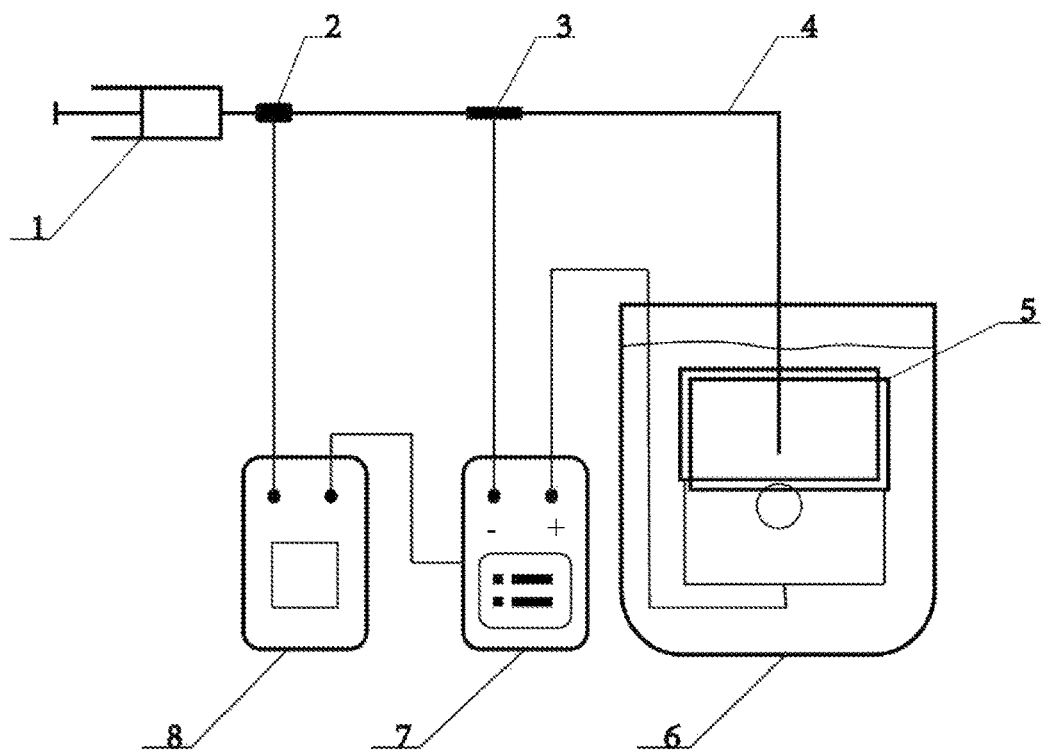
FIG. 2 is a sketch view of a droplet preparation and size control device based on electrowetting with a single chip microcomputer and a flow sensor according to the preferred embodiment of the present invention.

In order to realize the automatic control of the droplet diameter and obtain the uniform droplets with the specified diameter, the droplet preparation and size control device based on electrowetting step emulsification further comprises a flow sensor 2 and a single chip microcomputer 8, wherein the flow sensor 2 is connected between the syringe pump 1 and the metal pipeline 3, a signal collection port of the single chip microcomputer 8 is connected with the flow sensor 2, and a control signal output port of the single chip microcomputer 8 is connected with a communication port of the direct-current power supply 7, as shown in FIG. 2; according to a function relationship among the diameter of each droplet, the flow and the voltage, which is obtained through a history test, the single chip microcomputer automatically measures a current flow and adjusts the voltage of the direct-current power supply, so as to obtain the uniform droplets with the specified diameter.

Figure 5:
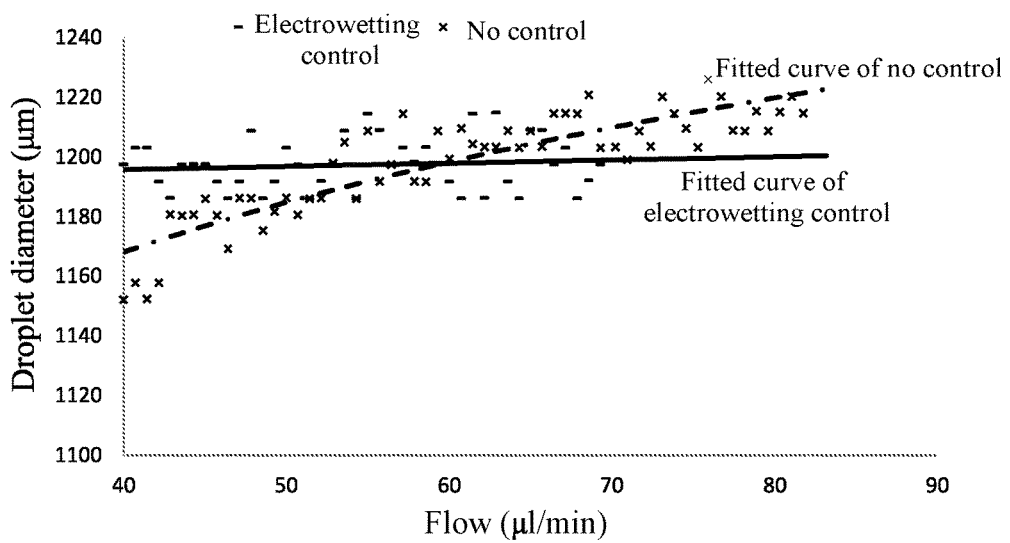
FIG. 5 is a sketch view of measured (droplet diameter)-flow curves with adopting the device shown in FIG. 2.

Preparation results of the micro-droplets automatically controlled by the single chip microcomputer are drawn in a fitted curve of electrowetting control shown in FIG. 5, and a group of data with no control is drawn in a fitted curve of no control shown in FIG. 5 to compare the control effect. It can be seen from FIG. 5 that: when implementing the electrowetting control, with the increase of the flow from 40 μl/min to 80 μl/min, the sizes of the micro-droplets are always stabilized near the preset value of 1200 μm, and a slope of the fitted curve is relatively small; when no control is exerted, with the increase of the flow from 40 μl/min to 80 μl/min, the sizes of the micro-droplets increase from 1170 μm to 1220 μm. It is obvious that the automatic control of electrowetting enables the overall variable coefficient of the micro-droplets to be rapidly decreased, so that the flow fluctuation is eliminated and the sizes of the micro-droplets are stabilized. If further increasing the precision of the excitation voltage and the precision of the flow measurement, the control system can prepare the ultra-uniform millimeter-scale droplets.

What is claimed is:

1. A droplet preparation and size control device based on electrowetting step emulsification, comprising: a syringe pump (1), a metal pipeline (3), a micro-channel (4), two electrode plates (5), a continuous phase container (6) and a direct-current power supply (7), wherein: the syringe pump (1), the metal pipeline (3) and the micro-channel (4) are successively connected; an outlet of the micro-channel (4) is clamped and sealed between the two electrode plates (5); each electrode plate (5) consists of four layers, respectively a base layer, a conducting layer, an insulating layer and a hydrophobic layer; a cathode of the direct-current power supply (7) is connected with the metal pipeline (3), and an anode of the direct-current power supply (7) is connected with the conducting layer of each electrode plate (5); the syringe pump (1) is filled with dispersed phase fluid; continuous phase fluid is injected into the continuous phase container (6) and immerses the electrode plates (5); the syringe pump (1) is pulled, so that droplets are generated at lower parts of the electrode plates (5); then the direct-current power supply (7) is switched on, so as to enable the dispersed phase fluid in the micro-channel (4) to be negatively charged; the two electrode plates (5) are positively charged and form a capacitor; when a flow of the syringe pump (1) changes, sizes of the droplets are adjusted through adjusting a voltage of the direct-current power supply (7), so as to stably obtain the droplets with a specified diameter; the dispersed phase fluid is a conducting solution, and the continuous phase fluid comprises components of silicone oil and surfactant.

2. The droplet preparation and size control device based on the electrowetting step emulsification, as recited in claim 1, further comprising a flow sensor (2) and a single chip microcomputer (8), wherein the flow sensor (2) is connected between the syringe pump (1) and the metal pipeline (3); a signal collection port of the single chip microcomputer (8) is connected with the flow sensor (2), and a control signal output port of the single chip microcomputer (8) is connected with a communication port of the direct-current power supply (7); according to a function relationship among the diameter of each droplet, the flow and the voltage, which is obtained through a history test, the single chip microcomputer (8) automatically measures a current flow and adjusts the voltage of the direct-current power supply, so as to obtain the uniform droplets with the specified diameter.

3. The droplet preparation and size control device based on the electrowetting step emulsification, as recited in claim 1, wherein: a distance between the two electrode plates (5) is h, a distance from the outlet of the micro-channel (4) to bottom sides of the electrode plates (5) is l≥3h.

4. The droplet preparation and size control device based on the electrowetting step emulsification, as recited in claim 2, wherein: a distance between the two electrode plates (5) is h, a distance from the outlet of the micro-channel (4) to bottom sides of the electrode plates (5) is l, l≥3h.

5. The droplet preparation and size control device based on the electrowetting step emulsification, as recited in claim 1, wherein: the dispersed phase fluid comprises components of glycerinum, water and sodium chloride with weight percentages respectively of 80 wt %, 19 wt % and 1 wt %; the continuous phase fluid comprises components of silicone oil and surfactant with weight percentages respectively of 95 wt % and 5 wt %.

* * * * *